(12) United States Patent
Allison et al.

(10) Patent No.: US 9,689,771 B2
(45) Date of Patent: Jun. 27, 2017

(54) PIPE AND CONDUIT WEAR DETECTION SYSTEM

(71) Applicant: Progressive Products, Inc., Pittsburg, KS (US)

(72) Inventors: Todd N. Allison, Pittsburg, KS (US); Stephen T. Hinton, Pittsburg, KS (US)

(73) Assignee: Progressive Products, Inc., Pittsburg, KS (US)

( * ) Notice: Subject to any disclaimer, the term of this patent is extended or adjusted under 35 U.S.C. 154(b) by 54 days.

(21) Appl. No.: 14/303,350

(22) Filed: Jun. 12, 2014

(65) Prior Publication Data

US 2014/0366975 A1 Dec. 18, 2014

Related U.S. Application Data

(60) Provisional application No. 61/834,588, filed on Jun. 13, 2013.

(51) Int. Cl.
| | |
|---|---|
| *F16L 55/00* | (2006.01) |
| *G01M 3/04* | (2006.01) |
| *F17D 5/06* | (2006.01) |
| *G01M 3/16* | (2006.01) |
| *G01M 3/18* | (2006.01) |
| *F16L 57/06* | (2006.01) |

(52) U.S. Cl.
CPC .............. *G01M 3/047* (2013.01); *F16L 57/06* (2013.01); *F17D 5/06* (2013.01); *G01M 3/045* (2013.01); *G01M 3/165* (2013.01); *G01M 3/18* (2013.01); *Y10T 29/49764* (2015.01)

(58) Field of Classification Search
USPC .......................................... 138/36, 104, 146
See application file for complete search history.

(56) References Cited

U.S. PATENT DOCUMENTS

| | | | | |
|---|---|---|---|---|
| 4,446,892 A | * | 5/1984 | Maxwell ................ | F16L 11/12 116/227 |
| 4,554,650 A | * | 11/1985 | Brown .................. | G01V 1/201 138/103 |
| 4,652,848 A | | 3/1987 | Hundrieser | |
| 4,684,155 A | * | 8/1987 | Davis .................. | B65G 53/523 138/139 |
| 5,634,497 A | * | 6/1997 | Neto ..................... | F16L 11/088 138/104 |
| 6,019,136 A | | 2/2000 | Walsh et al. | |
| 6,108,202 A | | 8/2000 | Sumida | |
| 6,284,332 B1 | * | 9/2001 | Buettner ............... | F01N 13/102 123/434 |

(Continued)

*Primary Examiner* — James Hook
(74) *Attorney, Agent, or Firm* — Law Office of Mark Brown, LLC; Christopher M. DeBacker; Mark E. Brown

(57) ABSTRACT

A pipe section, such as a pipe elbow, coated with a ceramic coating containing a fusible link displaced within. The link includes two exposed testing leads which are connected to a sensor which sends a signal across the link. Over time, the pipe section and the coating are worn away by material flowing through the pipe. Eventually the fusible link is severed due to the wear, signaling the sensor to send an alert, notifying that the pipe section needs to be replaced. The method of manufacture includes coating a standard pipe section with a ceramic coating, displacing a fusible link therein, and curing the coating. The coating may contain any number of fusible links in any conceivable arrangement.

4 Claims, 8 Drawing Sheets

(56) References Cited

U.S. PATENT DOCUMENTS

| | | | | |
|---|---|---|---|---|
| 6,305,427 B1* | 10/2001 | Priest, II | ............... | F16L 11/12 138/104 |
| 6,386,237 B1* | 5/2002 | Chevalier | ............... | F16L 11/12 116/208 |
| 6,498,991 B1* | 12/2002 | Phelan | ............... | G01M 3/18 138/104 |
| 6,539,981 B1* | 4/2003 | Kleven | ............... | G01F 1/58 138/104 |
| 6,945,098 B2* | 9/2005 | Olson | ............... | B04C 11/00 138/36 |
| 7,922,149 B2 | 4/2011 | Anderson et al. | | |
| 8,087,430 B1* | 1/2012 | Betz | ............... | F16L 11/12 138/104 |
| 8,497,425 B2* | 7/2013 | Morrow | ............... | B29C 47/025 138/104 |
| 2004/0065377 A1* | 4/2004 | Whiteley | ............... | F16L 11/127 138/104 |
| 2004/0200536 A1* | 10/2004 | Strasser | ............... | A62C 33/00 138/104 |
| 2007/0131297 A1* | 6/2007 | Spaolonzi | ............... | G01M 3/047 138/104 |
| 2009/0067777 A1* | 3/2009 | Beinhocker | ............... | F17D 5/00 385/12 |
| 2010/0263761 A1* | 10/2010 | Niccolls | ............... | B32B 1/08 138/146 |
| 2012/0235860 A1 | 9/2012 | Ghazarian | | |
| 2012/0242448 A1 | 9/2012 | Faltermeier et al. | | |
| 2012/0242449 A1 | 9/2012 | Faltermeier et al. | | |
| 2013/0061971 A1* | 3/2013 | Chamberland | ............... | F16L 9/125 138/104 |

\* cited by examiner

PIPE AND CONDUIT WEAR DETECTION SYSTEM

CROSS-REFERENCE TO RELATED APPLICATION

This application claims priority in U.S. Provisional Patent Application Ser. No. 61/834,588, filed Jun. 13, 2013, which is incorporated herein by reference.

BACKGROUND OF THE INVENTION

1. Field of the Invention

The present invention relates generally to a system for detecting wear within a pipe or conduit section, and more specifically to monitoring the wear within a pipe or conduit section with a sensor element located within a ceramic coating, and a method of manufacturing thereof.

2. Description of the Related Art

Pipe and conduit sections, particularly elbow sections, are prone to wear and tear as product is driven through them. The more abrasive a product, the more quickly the pipe or conduit will wear out. Some industries simply replace the sections as the pipes wear out and holes form within them, but this can lead to serious downtime in many industries, such as manufacturing. Further, the product being driven through pipes or conduits may be hazardous, thereby necessitating early detection prior to a leak forming Coating pipe and conduit elements, such as elbows, T-sections, and straight sections, with ceramic coating or other protective coatings may prevent corrosion and external wear on the pipe, but does little to prevent corrosion or erosion from within the pipe and will eventually wear down over time despite being more wear-resistant than standard, non-coated pipe sections.

What is needed is a simple method of applying or installing a pipe wear detection system on prefabricated pipe and conduit sections cheaply and efficiently.

Heretofore there has not been available a system for monitoring and detecting wear within a pipe or conduit section with the features and elements of the present invention.

SUMMARY OF THE INVENTION

The present invention presents a wear-resistant, ceramic-coated pipe or conduit section, such as an elbow section, with a wear detection and notification system. The wear detection elements are inserted directly into the ceramic coating as it is applied to the pipe or conduit section. As the pipe is worn away from the inside, the wear detection system produces an output signal which can alert a technician when a significant portion of the pipe has worn away, but before a hole develops in the pipe section itself.

The wear detection system requires a sensor element to be buried into the ceramic coating of a pipe section. The sensor element may be a wire, a hollow tube, a fiber-optic thread, or any similarly suitable element. As the pipe and coating is worn away, the sensor element is exposed and, eventually, worn away itself. This triggers an alert which signals to a technician that the pipe element needs to be replaced. This allows the pipe to be replaced on a preferred schedule and prevents the sudden failure of a pipe element while the pipe is in use, which could lead to hazardous results.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Pipe Wear Detection System and Method of Manufacture Generally

The present invention generally comprises a pipe or conduit section which is coated with a wear-resistant ceramic material. Embedded within the ceramic material is a sensor element for alerting a technician or other person responsible for monitoring the status of the pipe or conduit sections when a significant portion of the pipe has worn away.

In one embodiment, a fusible link is embedded within the ceramic material. The ends of the link act as leads which may be monitored remotely using a multi-meter, a computer processor (CPU), or by any other suitable means. As the pipe section and the ceramic coating are worn away, the fusible link will be exposed. The fusible link will have a base resistance measured by the multimeter, CPU, or other monitoring device. As the link is worn away the resistance of the link will increase. This increase in resistance will signal to an end user that the pipe has worn away internally.

Figure 9:
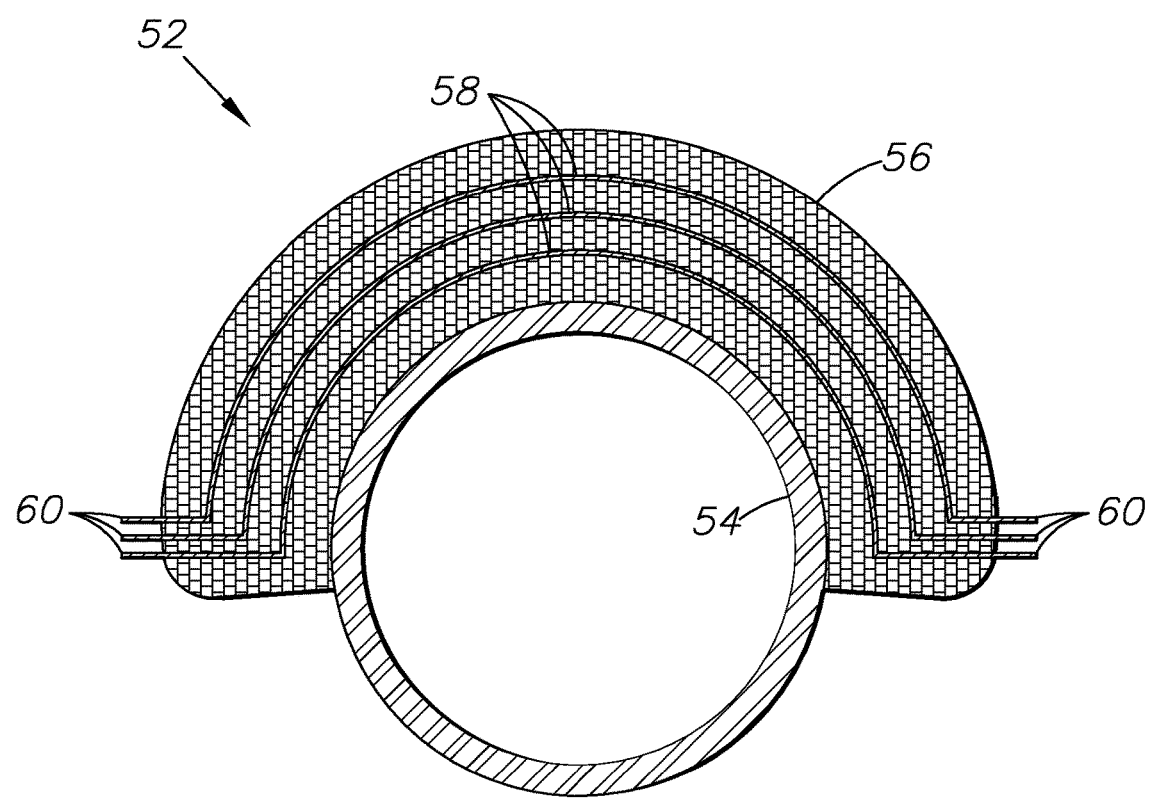
FIG. 9 is a front cross-sectional view of an alternative embodiment of the present invention.

In another embodiment a number of links may be embedded within the ceramic coating at varying depths as shown in FIG. 9. This will provide a number of outputs which allows the wear of the pipe to be monitored as it progresses through each fusible link. The person monitoring the output signals could then decide when the pipe has worn away enough that it warrants replacement. This may vary depending on what is being driven through the pipe section, an operating schedule for use of the pipe, or by other internal or external factors.

Figure 10:
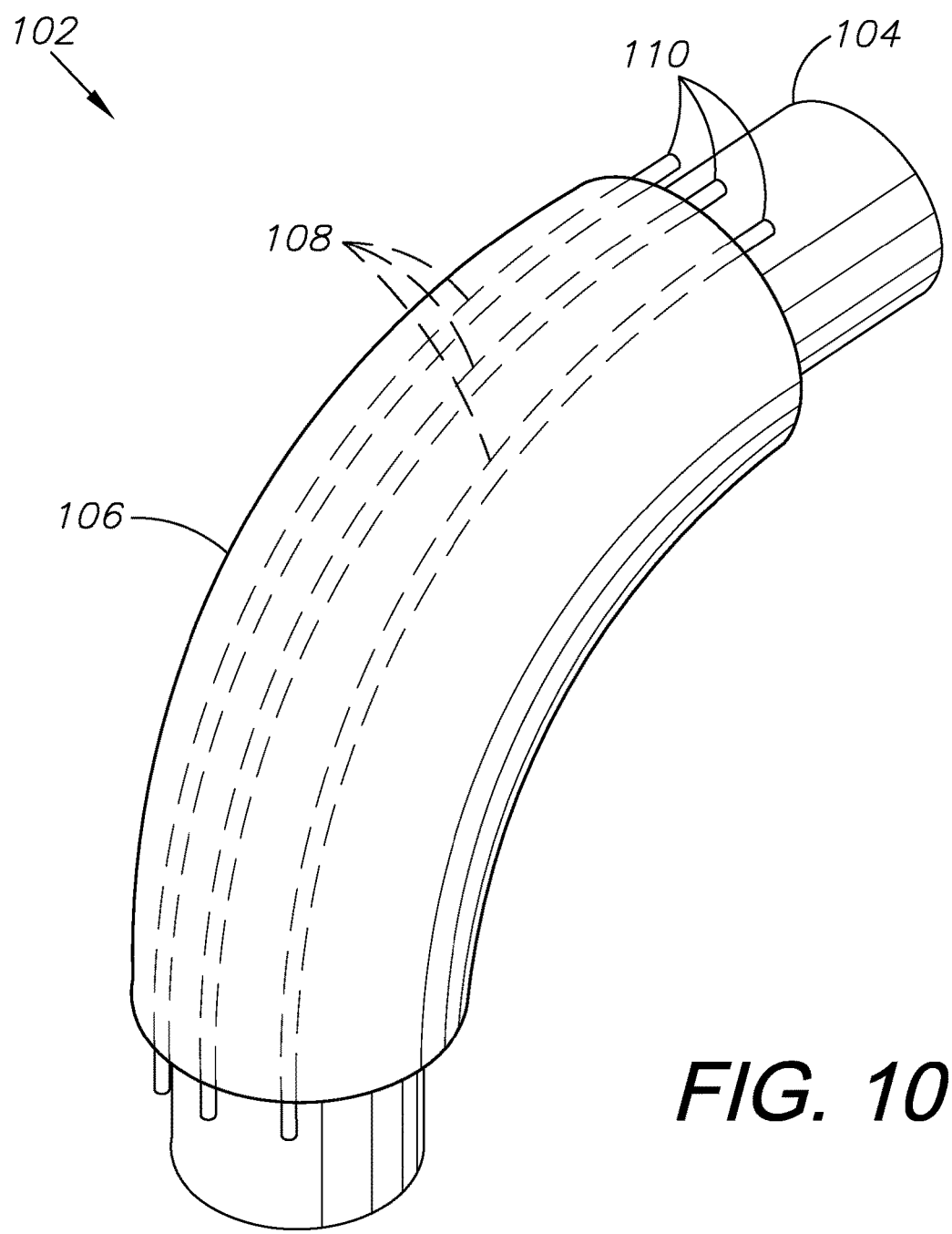
FIG. 10 is an isometric view of another alternative embodiment of the present invention.
Figure 11:
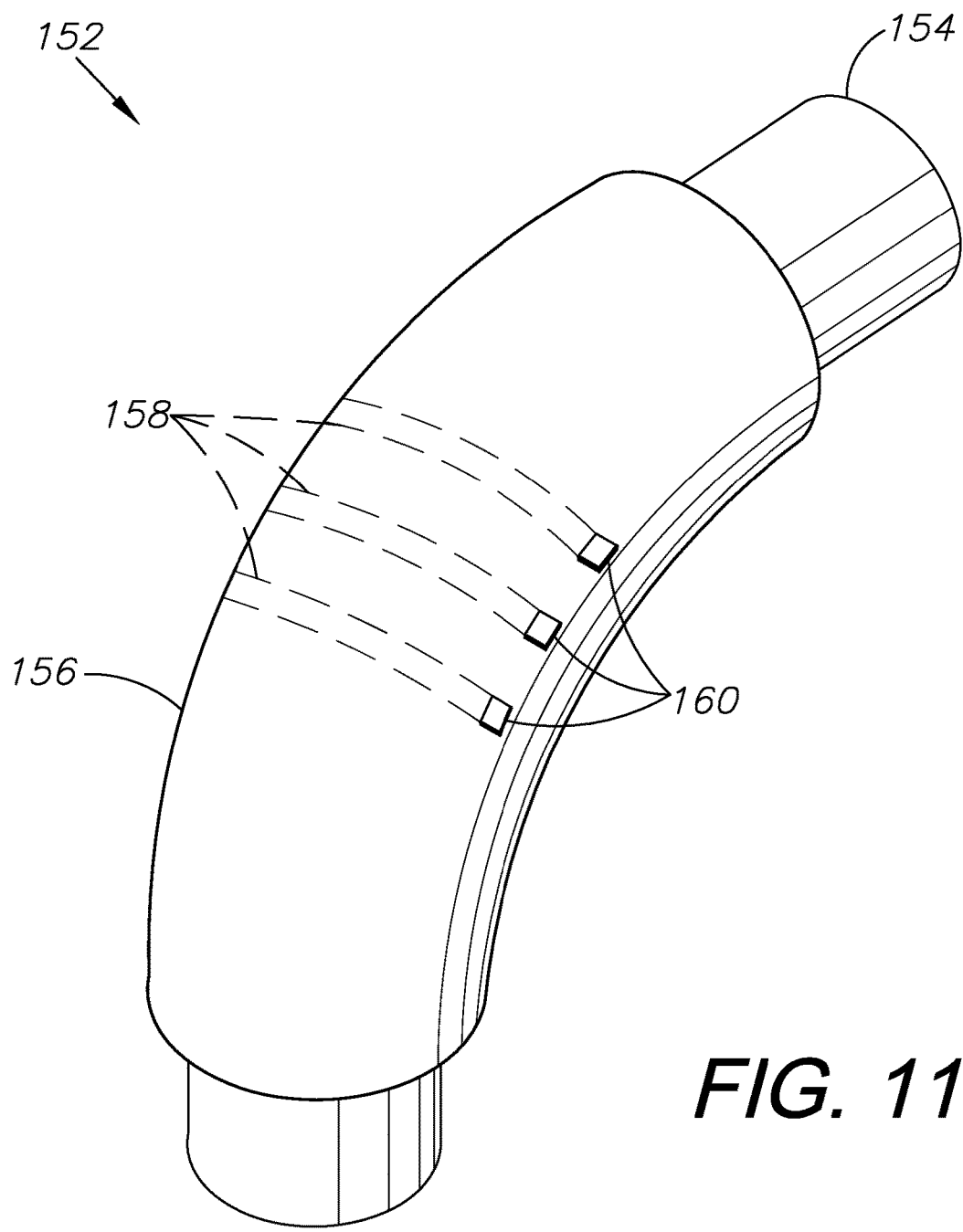
FIG. 11 is an isometric view of yet another alternative embodiment of the present invention.

In another embodiment a number of links may be embedded within the ceramic coating running lengthwise along the pipe section as shown in FIG. 10, or along the body at varying distances apart as shown in FIG. 11, or in some combination of the two resulting in a mesh of sensor elements. The output from the plurality of sensor elements can be used to generate a "wear profile" on the pipe element, which can result in the manufacture of pipe elements that are stronger in areas that are shown to wear away first. Other feasible uses of such a wear profile are likely.

The wear detection system could also use a hollow tube that either contains a vacuum or pressurized air in lieu of the fusible link described above. The pressure within the tube would be monitored constantly. Once the tube wall is worn away, the pressure sensor will immediately pick up on the change of pressure within the tube. Unlike the fusible link which may be used to slowly indicate the increase in wear as the resistance increases, the hollow tube sensor would only indicate the progress of wear within the pipe once the tube has been worn away. Such a tube may be preferable when explosive liquid or gas is being driven through the pipe elements and where a spark could result in an explosion or a fire.

Alternatively, the wear detection system could use a fiber optic thread or a fiber optic cable. Such a cable would function similarly to the hollow tube example above. An optical signal would be read by a sensor such as a CPU. Once the fiber optic thread or cable is worn through, that signal will degrade and eventually disappear, signaling that the pipe section has worn through a significant portion.

The present invention is primarily important for ensuring that pipe sections, such as elbow sections, do not fail catastrophically while dangerous or valuable materials are being transported through the pipe. Such a catastrophic failure can result in loss of product, slowdown in production, or other negative consequences. The failure also requires a repair to take place immediately, which prevents the pipe from being used until the pipe element is replaced.

The present invention would allow the replacement of heavily worn pipe sections to be scheduled when the pipe is not in use or between shifts. The pipe can also be shut-off prior to replacement so that no material is lost or spilled.

III. Preferred Embodiment Pipe Section 2 with Fusible Link 8

Figure 1:
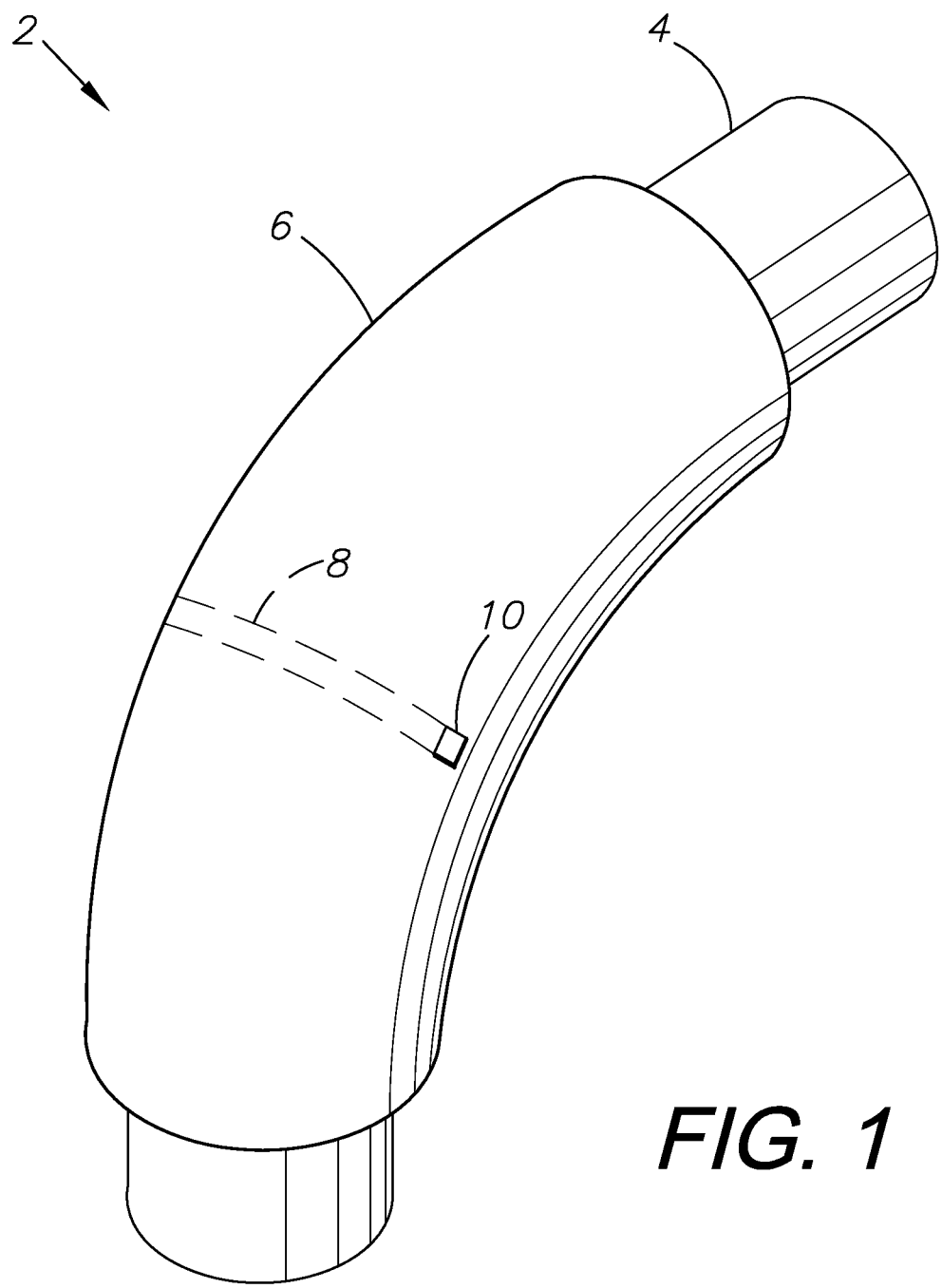
FIG. 1 is an isometric view of a metal pipe elbow fitted with an embodiment of the present invention.

Referring to the figures, FIG. 1 shows a preferred embodiment pipe section 2 having a single fusible link 8. The pipe section 2 is comprised of a pipe 4 covered in a wear resistant, ceramic coating 6. The coating could be made of any wear resistant material. The pipe may be made of metal, Polyvinyl Chloride (PVC), or some other typical pipe material. The fusible link 8 is buried within the ceramic coating 6, as shown in more detail in FIG. 2, with a test point 10 exposed at either end of the link 8. It should be noted that the coating could completely surround the pipe section, but typically would not be necessary as the wear-point is likely at the turn in the pipe section elbow.

Figure 2:
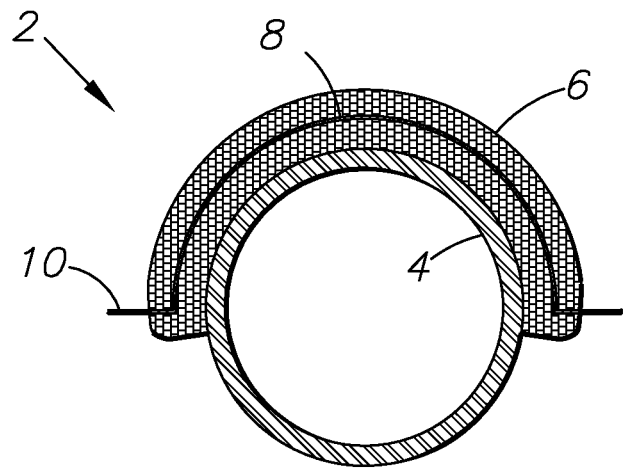
FIG. 2 is a front cross-sectional view thereof.
Figure 3:
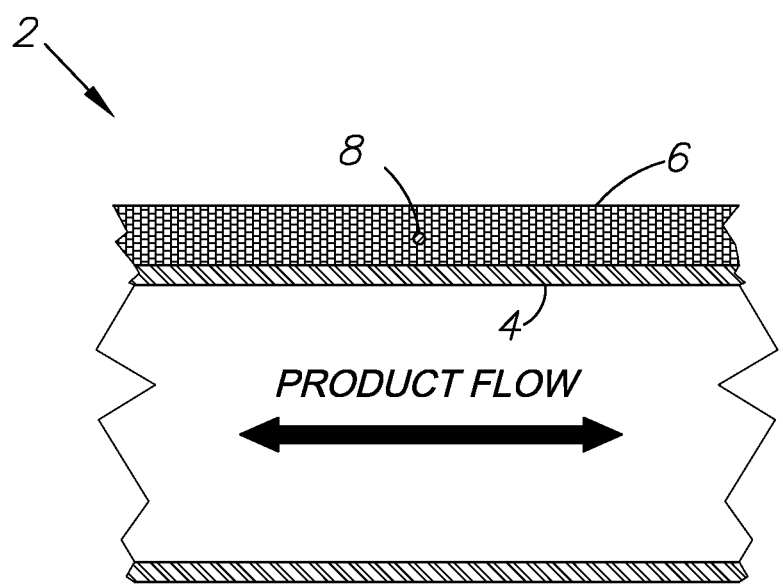
FIG. 3 is a side cross-sectional view thereof.
Figure 4:
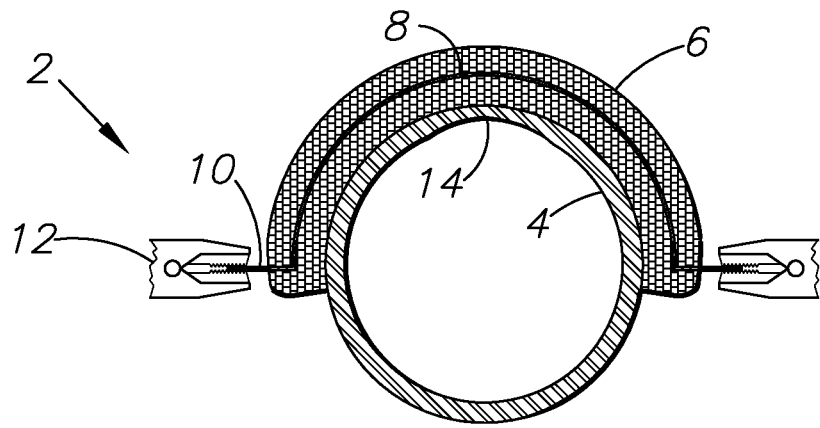
FIG. 4 is a front cross-sectional view showing a first stage of wear within a metal pipe section coated with ceramic.
Figure 5:
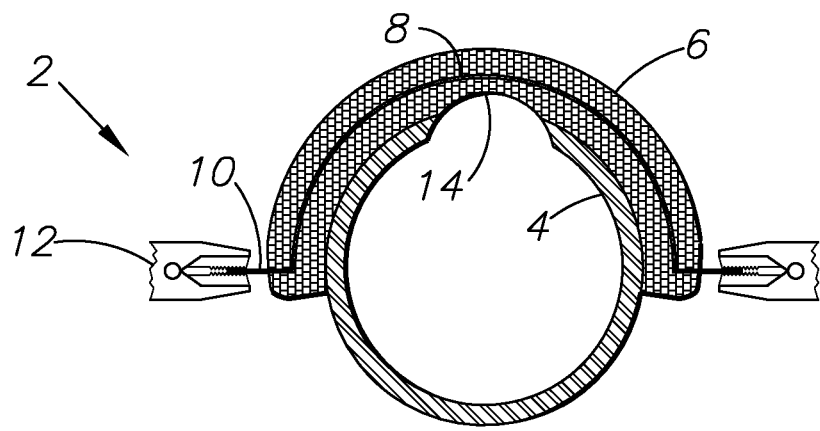
FIG. 5 is a front cross-sectional view showing a second stage of wear thereof.
Figure 6:
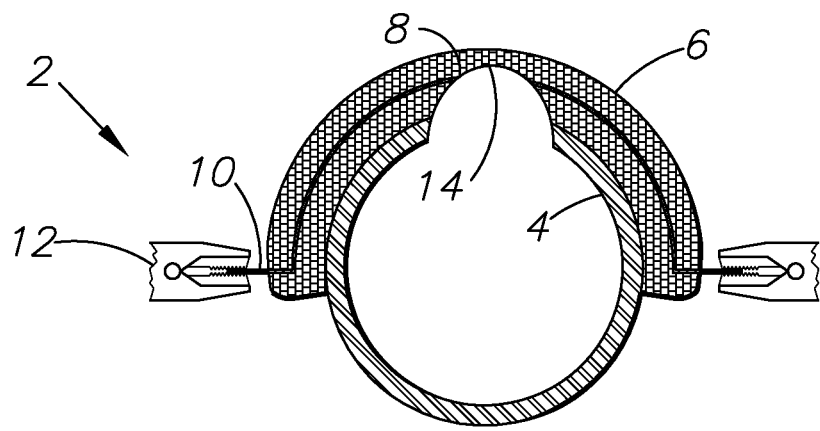
FIG. 6 is a front cross-sectional view showing a third stage of wear thereof.

FIGS. 2 and 3 present cross-sectional views of a pipe section 2 featuring a fusible link 8. Material flows through the pipe 4 and wears away at the pipe. As shown in a progression through FIGS. 4-6, the pipe eventually wears away, and the worn area 14 eventually extends through the pipe 4 into the ceramic coating 6. Eventually the worn area 14 extends through the fusible link 8. Once the fusible link is broken, a sensor 16 is alerted via detectors 12 attached to the exposed test points 10 of the fusible link 8.

Figure 7:
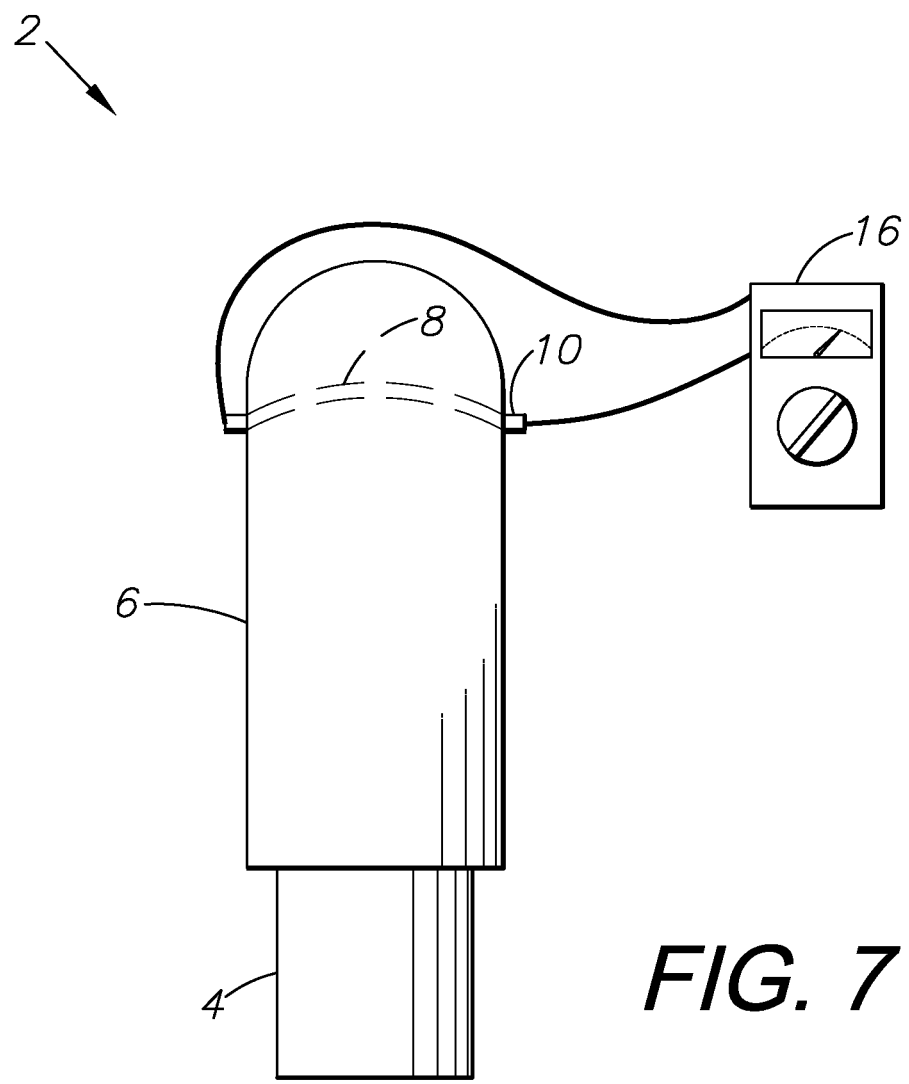
FIG. 7 is an isometric view of a metal pipe elbow fitted with an embodiment of the present invention including a multimeter for measuring resistance across a fusible link sensor.

FIG. 7 shows the sensor 16 as a simple multi-meter. However, the sensor could be any device which detects a break in signal through the fusible link and, therefore, provide an alert that the pipe is worn and needs to be replaced.

Figure 8A:
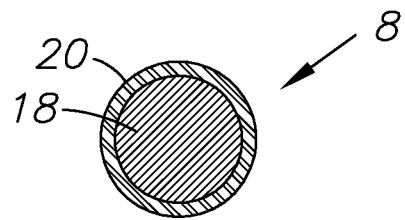
FIG. 8A is a cross-section of a fusible link.
Figure 8B:
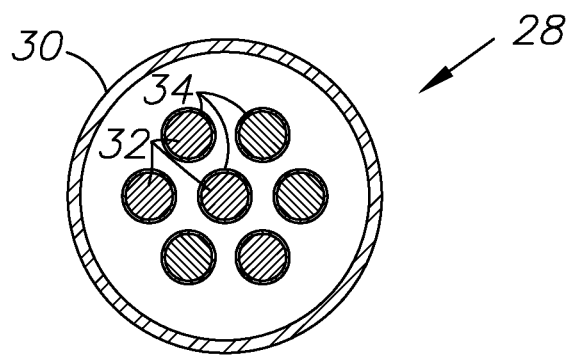
FIG. 8B is a cross-section of an alternative fusible link.
Figure 8C:
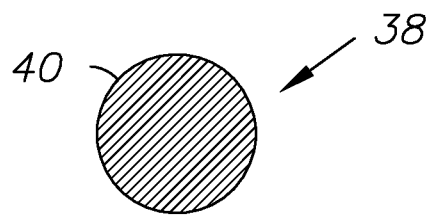
FIG. 8C is a cross-section of yet another alternative fusible link.

FIGS. 8A-8C show different variations of a fusible link 8, 28, 38. The fusible link 8 in FIG. 8A has a metal wire 18 surrounded by a protective sheath 20. The fusible link 28 in FIG. 8B includes a bundle of wires 32, each containing a protective sheath 34, contained within a conduit 30. The fusible link 38 in FIG. 8C is a solid rod 40 with no protective sheath. Any other variation of a fusible link capable of completing the circuit from one testing point 10 to the other would be suitable as a fusible link.

IV. Alternative Embodiment Pipe Section 52

FIG. 9 shows an alternative embodiment pipe section 52 having multiple fusible links 58, each with their own testing points 60, all encased in a ceramic coating 56 around the pipe 54. The sensor would detect the progression of the wear in the pipe and the coating as each link is broken. Once the third link is broken, the pipe would need to be replaced.

V. Alternative Embodiment Pipe Section 102

FIG. 10 shows an alternative embodiment pipe section 102 having multiple fusible links 108, each with their own testing points 110, all encased in a ceramic coating 106 around the pipe 104. The arrangement of the fusible links allows detection of wear within the pipe that may be abnormal. This can happen if the pipe is not manufactured correctly, if the pipe is not installed correctly, or if the ceramic coating is incorrectly applied. The arrangement of the links therefore gives a greater chance that the wear will be detected prior to failure of the pipe section.

VI. Alternative Embodiment Pipe Section 152

FIG. 11 shows an alternative embodiment pipe section 152 having multiple fusible links 158, each with their own testing points 160, all encased in a ceramic coating 156 around the pipe 154. The arrangement of the fusible links allows detection of wear within the pipe that may be abnormal. This can happen if the pipe is not manufactured correctly, if the pipe is not installed correctly, or if the ceramic coating is incorrectly applied. The arrangement of the links therefore gives a greater chance that the wear will be detected prior to failure of the pipe section.

The combination of the embodiments shown in FIGS. 10 and 11 could also be used to create a latticework for even more precise detection of wear.

VII. Method of Manufacture

The method of manufacturing a preferred embodiment pipe section having a fusible link begins with a standard pipe section. The pipe section will likely be an elbow section or other section where a high degree of wear is likely. The pipe is dipped into a ceramic coating mixture. The fusible link is placed within the ceramic coating such that it is displaced within the coating between the pipe section and the uppermost edge of the coating. The coating is then cured to harden, thereby permanently fixing the fusible link within the coating, and permanently affixing the coating to the exterior of the pipe section. The exposed testing leads of the fusible link are then connected to a sensor which puts a charge or a signal across the link.

It is to be understood that the invention can be embodied in various forms, and is not to be limited to the examples discussed above. The range of components and configurations which can be utilized in the practice of the present invention is virtually unlimited.

Having thus described the disclosed subject matter, what is claimed as new and desired to be secured by Letters Patent is:

1. A pipe section comprising:
    a piece of pipe partially coated in a wear-resistant coating;
    a fusible link displaced within said wear-resistant coating, said fusible link including a first exposed test lead and a second exposed test lead located at a respective end of said fusible link;
    a sensor electrically connected to each of said first and second exposed test leads, said sensor configured to send a signal across said fusible link;
    wherein said sensor detects wear correlating with changes of levels of said signal measured across said fusible link;
    wherein said sensor is further configured to signal when said fusible link is broken;
    wherein said fusible link is a pressurized airline; and
    wherein said sensor is an air pressure monitor.
2. The pipe section of claim 1, wherein said pipe section is a metal pipe elbow.
3. The pipe section of claim 1, wherein said wear-resistant coating is a ceramic coating.
4. The pipe section of claim 1, further comprising:
    a second fusible link displaced within said wear-resistant coating, said second fusible link including a third exposed test lead and a fourth exposed test lead located at a respective end of said second fusible link.

\* \* \* \* \*